United States Patent [19]

Schiffman

[11] 4,161,409

[45] Jul. 17, 1979

[54] CORROSION INHIBITIVE PIGMENT

[76] Inventor: Louis Schiffman, 1837 Merritt Rd., Abington, Pa. 19001

[21] Appl. No.: 883,507

[22] Filed: Mar. 6, 1978

[51] Int. Cl.$^2$ ............... C08K 3/10; C09C 1/34; C09D 5/08

[52] U.S. Cl. ............... 106/14.21; 106/14.25; 106/14.39; 106/302; 148/6.2; 423/607

[58] Field of Search ............... 106/302, 289, 14.21, 106/14.25, 14.39; 423/607; 148/6.2

[56] References Cited

U.S. PATENT DOCUMENTS

| | | | |
|---|---|---|---|
| 987,965 | 3/1911 | Cushman | 106/302 |
| 2,387,528 | 10/1945 | Patterson et al. | 23/56 |
| 2,410,916 | 11/1946 | Wilson et al. | 23/56 |
| 2,430,589 | 11/1947 | Sloan | 106/302 |
| 2,838,419 | 6/1958 | Francis | 106/302 X |
| 2,902,394 | 9/1959 | Jeremias | 148/6.21 |
| 3,063,877 | 11/1962 | Schiffman | 148/6.2 |
| 3,279,958 | 10/1966 | Maurer et al. | 148/6.16 |
| 3,585,260 | 6/1971 | Holker et al. | 106/302 |
| 3,911,095 | 10/1975 | Montiglio et al. | 423/607 |

FOREIGN PATENT DOCUMENTS

| | | | |
|---|---|---|---|
| 532469 | 10/1956 | Canada | 423/607 |
| 162117 | 4/1964 | U.S.S.R. | 423/607 |

OTHER PUBLICATIONS

Kirk-Othmer, Encyclopedia of Chemical Technology, 2d ed. (19) 5, pp. 505–510.

Udy, Chemistry of Chromium and its Compounds (1956) 1, pp. 357–384.

*Primary Examiner*—Helen McCarthy
*Attorney, Agent, or Firm*—B. Max Klevit

[57] ABSTRACT

A chromium chromate complex, obtained by partial reduction of chromic acid in aqueous media with an organic reducing agent, is converted to pigment form by evaporating the resulting aqueous composition to dryness and sub-dividing the obtained solid mass to suitable size. The obtained pigment, with or without intimately associated extenders, incorporated in a conventional vehicle, serves as a corrosion inhibitor in metal coating compositions.

14 Claims, No Drawings

CORROSION INHIBITIVE PIGMENT

BACKGROUND OF THE INVENTION

1. Field of the Invention

The present invention relates generally to the field of corrosion-inhibiting pigments and is particularly concerned with such pigments based on chromium compounds.

2. Prior Art

Metal protective pigments have long been used as components of coating compositions applied to metallic surfaces. Certain of these pigments have been, at least partially, effective in providing a specific inhibiting or passivating action at the surface of the metal. Among the useful pigments in this category are red lead and certain chromium containing pigments.

Red lead has been used for years in large quantities in the formulation of metal protective coatings having good rust-inhibitive properties. Such inhibitive activity is attributed, in part, to the fact that red lead is basic in reaction and further, to the formation of a protective metal oxide layer on the treated metal surface, which layer resists attack by corrosive elements.

Among the better known chromium-containing pigments suggested for use in metal protecting coatings are zinc yellow or so called "zinc chromate" and zinc tetroxy chromate. These, among other pigments, are described in Kirk-Othmer: *Encyclopedia of Chemical Technology*, 2d ed. Vol. 5, at pages 507–510; and by V. H. Chalupski in the monograph appearing in UDY: *Chemistry of Chromium and its Compounds*, Vol. 1, (Rheinhold Pub. Co. 1956) beginning at page 357, particularly pages 375–381. A further modified method for preparing zinc yellow is described in U.S. Pat. No. 2,410,916.

Among other chromium pigments asserted to possess corrosion inhibitive properties are included chromates of alkaline earth metals and respectively of lead and iron, which pigments may also include alkali metal cation (potassium). A number of these have been commercially exploited to some degree.

U.S. Pat. No. 2,387,528 describes alkaline earth metal chromates containing trivalent as well as hexavalent chromium, such as basic calcium chromito-chromate. These pigments, because of various drawbacks, have not achieved commercial significance; UDY, op. cit., at page 381; Kirk-Othmer, op. cit., Vol. 5 at page 510. These are prepared, according to the patent, by roasting a mixture of the alkaline earth chromate and an alkaline earth metal compound which is heat decomposable to the oxide, in designated proportions and grinding the resulting product.

In U.S. Pat. No. 2,430,589 metal protective pigments are described, composed of calcium chromate intimately associated with a minor portion of an admixed ferric, manganic or chromic oxide.

Chromic acid and its salts are included among the most effective corrosion inhibitive substances. The soluble chromates are recommended as among the best materials for use in protecting corrosion of metals such as iron, steel, zinc, aluminum copper, and alloys of these. The exact mechanism of corrosion inhibition is not known with certainty, but it is widely believed that protection is effected by the action of chromate ions made available by controlled solution on the metal surface. In the presence of chromates, it is generally thought, the local anodes that serve as corrosion centers become highly polarized. Thus, in the presence of soluble chromate, the metal appears to be more "noble".

Chromic acid and other soluble chromium-containing compounds have accordingly been used in aqueous metal treating or rinsing solutions applied to the metal surface or to the "conversion" coating thereon, to improve corrosion resistance and paint bonding characteristics. Thus, U.S. Pat. No. 2,902,394 describes protective metal finishing compositions for application to zinc surfaced articles, prepared by intimate admixture of chromic acid with aqueous nitric, sulfuric and acetic acids and with a sulfite-type reducing agent capable of reducing a minor portion of the hexavalent chromium to trivalent state.

An earlier patent of the present inventor, U.S. Pat. No. 3,063,877, describes aqueous solutions for treating metal surfaces to impart improved corrosion resistance, which solutions are prepared by partially reducing a dissolved hexavalent chromium compound with formaldehyde, under conditions such that at least 5% and preferably at least 20% of the total chromium is present in reduced state.

U.S. Pat. No. 3,279,958 describes rinsing of phosphate, chromate and other chemical conversion coatings on metal surfaces with a dilute aqueous acidic solution of a chromium-chromate complex, followed by a water rinse. The complex is prepared by treating aqueous chromic acid solution with an organic reducing agent which contains an active hydroxyl, aldehyde or carboxyl group, to reduce a portion of the hexavalent chromium to the trivalent state.

SUMMARY OF THE INVENTION

In accordance with the present invention, novel corrosion inhibiting pigments are provided in the form of finely divided solid particles of a chromium chromate, essentially free of other extraneous metal cation and free of acidic anions which might otherwise tend to promote metal corrosion.

The novel pigments of the invention are produced by partial reduction of a hexavalent chromium compound such as chromic acid in aqueous solution, with an oxidizable organic water-soluble compounds containing an active hydroxyl, aldehyde or carboxyl group; evaporating the resulting aqueous reaction product to dryness, and grinding the residual solid mass to particle size suitable for use as pigment.

The pigments thus obtained when applied in conventional vehicles for coating metal surfaces have a passivating effect on such surfaces and impart pronounced capacity for resisting corrosion.

DETAILED DESCRIPTION

A wide selection of oxidizable organic compounds is applicable for partial reduction of the chromic acid; e.g. formaldehyde, methanol, ethanol, citric acid, sucrose, furfural, etc. From the standpoint of convenience, economy and performance, the preferred reducing agents are methanol, formaldehyde and furfural.

The concentration of the chromic acid solution and the mol ratio of reductant to chromic acid have an important effect on the extent of reduction of hexavalent chromium. In general, the higher the mol ratio of reductant to chromic acid, the higher the percentage of reduction; the percentage reduction increases, and then diminishes with increased concentration of chromic acid, other factors being equal.

It has been further found that the extent of reduction of the hexavalent chrome is not only a function of the concentration of reactants, but is also dependent upon the specific reducing agent employed. For example, in reaction of a 30% aqueous solution of chromic acid with commercial formalin (36.6% $CH_2O$), at the respective mol ratio of 3:1, 42% of the hexavalent chromium is reduced. in the analogous situation with other reductants, for example, such as methanol, furfural, citric acid, sucrose, etc., the extent of reduction varies from about 35% to 70%. It is also to be noted that the rates of reaction between the reductant and the chromic acid solution may vary depending upon reaction conditions including the dosage and concentration of the reactants. In some cases, for example, the addition of reductant to the chromic acid solution results in an almost instantaneous reaction, while in other cases, an induction period is had until the initiation of reaction becomes visibly apparent by evolution of gas and darkening of the solution. Furthermore, in some instances gel formation may occur. In any case, good corrosion inhibitive properties are obtained with reaction products varying over a broad range in the ratio of hexavalent to reduced chromium.

By the in situ reduction of chromic acid with organic reducing agent by the method employed in practice of the present invention, there is obtained as product, a chemical compound comprising chromium in both hexavalent and trivalent state, which compound is characterized by its property of imparting to metal surfaces a high degree of corrosion resistance. The mere admixture of a hexavalent chromium compound with a trivalent chromium compound does not obtain a comparable corrosion resistant composition as effective as the pigments of the invention on the basis of the corresponding total chromium content.

Because of the nature of the raw materials employed, and the nature of its manufacture, the novel pigments produced in accordance with the present invention are substantially free of soluble chlorides and sulfates typically found in certain other pigments, which ions tend to promote corrosion of base metals. Moreover, the pigments of the present invention do not contain heavy metals other than chromium and accordingly a higher content of corrosion-inhibiting chromate is available per unit weight of the pigment than that available in other chromate containing pigments. The pigments of the invention are compatible and stable with a wide range of paint vehicles and pigments in commercial use, including both water-based and oleoresinous systems.

The particular extent of reduction of the hexavalent chromium starting material is not critical. It was found that corrosion protection is obtained when as little as 5% to as much as 70% of the total chromium is present in the reduced state. preferably the degree of reduction should be in the 25-65% range to provide most beneficial properties.

For practical purposes, in the manufacture of the novel pigments of the present invention, I have found it desirable to employ a 20-50% by weight aqueous solution of chromic acid and react it with a reductant of the type above described, in the ratio of less than 1 mol reductant per mol of chromic acid. Under these conditions there is obtained a solution of partially reduced chromate, which on subsequent evaporation to dryness and pulverization yields the desired chromium-chromate pigment. The thus obtained pigment will have hexavalent and trivalent chromium present within the desired ranges of content and possess the desirable combination of properties, including degree of chromate solubility, to provide effective corrosion inhibitive action.

In a preferred embodiment of the invention, a 33% by weight aqueous solution of chromic acid is employed, to which is slowly added with vigorous stirring, the selected organic reducing agent in the ratio of one mol of reductant per 3 mols of chromic acid solution. The reaction is highly exothermic and slow addition of the reductant with vigorous stirring is necessary during the entire period of addition to permit close control of temperature and reaction rate. The temperature should be kept below 95° C., preferably below 85° C. When addition of reductant is completed, stirring is continued until no further reaction (by gas evolution) is evident. The pigment is obtained by evaporating the total liquid reaction mass to dryness in any well-known acceptable manner, preferably below 150° C. The dry pigment is then pulverized to a fine powder in a ball, pebble, buhrstone, mikropulverizer, or other conventional type of pigment grinding mill. In general, the pigment product should be ground to a particle size preferably below 5 microns and more desirably to a range that at least the predominant portion will pass through a #325 standard sieve.

In the embodiment above described, any of the variety of oxidizable organic compounds may be used as the reducing agent, such as formaldehyde, methanol, furfural, sucrose, citric acid, etc. In the 1:3 ratio of the reductant to chromic acid, as set out above, the reaction results in the reduction of 35 to 65% of the starting chromic acid. Accordingly, the obtained pigments will have 65 to 35% of their total chromium in the chromate (VI) state, providing particularly good corrosion inhibitive properties.

Pigments prepared in accordance with the invention may be incorporated in film-forming primer coating compositions applied to metal surfaces to protect the same against corrosion. The novel dry pigments of the invention may be used in various waterborne systems such as water emulsion paints and coating compositions, in wash primer formulations, and in various organic-based coating systems utilizing oleoresinous vehicles. Among such oleoresinous vehicles are included drying oils such as linseed oil, china wood oil and the like. Further, the products of the invention may be incorporated alone or in addition to other pigments employed in paints and coating compositions comprising chlorinated rubber or synthetic resin bases such as systems including polymers of vinyl acetate and/or other vinyl esters, polymers of acrylic or methacrylic acid or esters thereof, alkyd and alkyd-fortified oleoresin systems, and esters of polyhydric alcohols with drying oil acids and other unsaturated carboxylic acids.

The novel pigments of the invention are generally compatible with commonly-used extender materials employed in paints and coating compositions, such as: diatomaceous silica, talcs, and other forms of magnesium silicates, etc. The desired extender may be added to the reaction solution or to the chromic acid solution prior to reaction with the reducing agent. Thus, the chromium chromate as formed is intimately and homogenously blended with the extender. The obtained slurry is then dried and pulverized, obtaining the extended pigment composition. The use of extender provides increased pigment volume, better suspension and consistency control, promoted adhesion to metal substrate and lower cost.

Best practical results in adapting the invention are obtained when care is taken to insure production of a final product having the ratio of hexavalent to trivalent chromium in the preferred range (between 0.54 and 3) and other desired properties including degree of solubility, particle size, etc. To obtain these desired attributes attention must be given to such factors as solution concentration of reactants, mol ratio of reactants, drying conditions and extent of pulverization.

In order to more fully describe certain methods in which the invention can be practiced, the following examples are given as illustrative thereof, and are not to be construed as intended to limit the scope of the invention.

EXAMPLE 1

150 pounds (=68.04 kg.) of chromium trioxide ($CrO_3$) are dissolved in 42 gallons (=159 liters) of water. To this solution is added, slowly and with vigorous stirring, a solution prepared by diluting 16 pounds (=7.26 kg.) methanol with 15 gallons (=57 liters) of water. The rate of addition is controlled so that excessive reaction is avoided. This can be monitored by keeping reaction temperature preferably below 85° C. After the reaction has largely subsided, the obtained liquid is transferred to evaporating trays for drying, which is preferably carried out below 150° C. The dried product is then ground to pigment particle size in a pebble mill.

Instead of methanol, other organic-reducing agents of the type hereinabove designated may be employed, such as, for example, formaldehyde, furfural, sucrose, etc. Since the extent of reduction of the hexavalent chrome depends not only upon concentration of the reactants but also upon the specific reducing agent employed, some adjustment may be required in the concentrations and proportions of the reactants when using other reducing agents than that specified in the foregoing example, to obtain a pigment having a hexavalent to trivalent chromium ratio in the desired or preferred range.

Since the liquid product initially obtained in the reaction of the chromic trioxide with the organic reducing agent in aqueous medium has strong surface absorptive properties, the incorporation of extenders into the ultimate pigment is facilitated, and the product obtained is in the form of an intimate relatively homogeneous association wherein the chromium chromate is built on the surfaces and bonded to the extender material. The thus modified pigment has the desired corrosion inhibitive properties of the chromium chromate with the further advantages of reduced density, increased bulking value and cost reduction.

The following example illustrates production of an extended corrosion-inhibiting pigment.

EXAMPLE 2

(a) A chromium chromate liquid concentrate is produced by dissolving 150 pounds (68.04 kg.) of chromium trioxide in 40 gallons (151.4 liters) of water. To this is added, slowly with stirring, 42 pounds (19.05 kg.) of commercial formalin (36.6% in 18 gallons (68.1 liters) water. The addition rate is controlled so that the reaction temperature does not exceed 85° C. When the reaction subsides, water is added to make a total of 100 gallons (378.5 liters) of concentrate. This concentrate contains 1.5 pounds of total chromium oxides per gallon (180 grams/liter). The chromium is present in both hexavalent and reduced state. For convenience, this liquid concentrate is designated "Solution A".

(b) To 50 gallons (189.25 liters) of Solution A there is added 110 pounds (49.9 kg.) of Emtal 41* talc, which obtains a ratio of 0.35/1 chrome pigment (calculated as Cr) to talc extender in the final pigment product. The slurry of talc and Solution A is stirred to assure complete and uniform admixture. Excess water is removed by heating under continued agitation.

*Emtal 41 is a naturally occurring hydrous magnesium silicate of about a micron average particle size, marketed by Englehard Minerals and Chemicals Corp.

The obtained moist cake is dried in a kiln at 175°–180° C. and then ground in a pebble mill to pigment size. For convenience, this is hereinafter referred to as "Pigment B".

EXAMPLE 3

Preparation of a Baking Primer (a) Solution A concentrate as prepared in Example 2(a) above, is evaporated and dried, then ground to pigment size. The product is designated for convenience "Pigment C".

Pigment C is formulated in a baking primer (Formula 2) and tested against a reference control (Formula 1) as tabulated below.

| Formula #1 | | |
|---|---|---|
| Component | lbs/100 gals. | gms/liter |
| Beckosol 13-412**(water soluble) | 100 | 119.8 |
| Red oxide | 92 | 110.2 |
| Barytes | 275 | 329.5 |
| Water (demineralized) | 193.5 | 231.8 |

**Beckosol 13-412 is a water soluble alkyd marketed by Reichold Chemicals, Inc.

The above components are ground in a pebble mill and there is admixed therewith, the following:

| Beckosol 13-412 (water soluble) | 162.5 | 194.7 |
|---|---|---|
| Water (demineralized) | 313.0 | 375.0 |
| 6% Manganese Naphthenate | 1.8 | 2.2 |
| 4% Calcium Naphthenate | 4.6 | 5.5 |

| Formula #2 | | |
|---|---|---|
| Component | lbs/100 gals. | gms/liter |
| Beckosol 13-412 | 100 | 119.8 |
| Red oxide | 68 | 81.5 |
| Pigment C | 24 | 28.8 |
| Barytes | 275 | 329.5 |
| Water (demineralized) | 193.5 | 231.8 |

The foregoing components are ground in a pebble mill and there is admixed therewith, the following:

| Beckosol 13-412 | 162.5 | 194.6 |
|---|---|---|
| Water (demineralized) | 313 | 375.0 |
| 6% Manganese naphthenate | 1.8 | 2.2 |
| 4% Calcium naphthenate | 4.5 | 5.5 |

Steel panels were cleaned and coated with the respective compositions of Formulas 1 and 2, baked for thirty minutes at 149° C., and tested in accelerated laboratory corrosion test. The test procedure involved longitudinally scratching of surface of each panel followed by partial immersion of panel in an aqueous solution containing 3% sodium chloride and 1% (by volume) of 30% hydrogen peroxide. The panel treated with Formula #1 showed evidence of corrosion within ten minutes exposure. The panel treated with the Formula #2 composition showed no evidence of corrosion until after 45 minutes exposure to test conditions.

While in the foregoing test formulations of baking primer, the chromium chromate pigment of the invention is employed at a concentration of 0.24 pounds per gallon (28.8 gms/L), it will be understood that the actual amount required for desired corrosion protection will vary widely depending upon the vehicle and other components of the paint or coating composition, the kind of metal surface to be protected, the film permeability and the weather or other environmental conditions to which the treated metal is to be exposed, among other factors. In general, the amount of the chromium chromate pigment required for a given surface area of the metal to be covered is no more than and usually less than heretofore advocated or utilized with previous corrosion inhibiting pigments, such as red lead, zinc yellow, and other basic zinc chromates.

The trend in the formulation of corrosion inhibitive priming coats is in the use of mixture of pigments. An example of a formulation employing such mixed pigments in an oleoresinous vehicle, is given below:

| Component | % by weight |
|---|---|
| Red iron oxide | 34.6 |
| Pigment C (Example 3a) | 10.0 |
| Micro talc | 4.0 |
| Whiting | 1.5 |
| Lecithin | 0.5 |
| Medium oil alkyd (70% solids) | 36.5 |
| Mineral spirit | 11.5 |
| Cobalt naphthenate (6%) | 0.4 |
| Lead naphthenate (24%) | 1.0 |

What is claimed is:

1. The method of preparing a corrosion-inhibiting pigment which comprises reacting a hexavalent chromium compound in aqueous solution with a water soluble oxidizable organic compound containing an active hydroxyl, aldehyde or carbonyl group at a temperature below 95° C. and under conditions to reduce 5 to 70% of the hexavalent chromium compound to lower valent state, evaporating the resulting aqueous reaction product to dryness at a temperature below 150° C., and pulverizing the dried product to pigment size range.

2. The method as defined in claim 1 wherein a 20-50% solution of chromic acid is employed and reacted with methanol wherein the mols of methanol to chromic acid is less than 1:1.

3. The method as defined in claim 1 wherein the oxidizable organic compound is formaldehyde.

4. The method as defined in claim 1 wherein the oxidizable organic compound is furfural.

5. The method as defined in claim 1 wherein 25 to 65% of the hexavalent chromium compound is reduced to lower valent state.

6. Corrosion inhibiting composition comprising a chromium chromate pigment wherein said chromium chromate contains 95 to 30% of the total chromium therein in hexavalent state, said pigment being essentially free of corrosive anions and also substantially free of extraneous heavy metals.

7. Corrosion-inhibiting composition as defined in claim 6 wherein said pigment is dispersed in a film-forming organic vehicle.

8. Composition as defined in claim 7 wherein said vehicle comprises a drying oil.

9. Composition as defined in claim 7 wherein said vehicle comprises at least one synthetic resin base.

10. Composition as defined in claim 7 wherein said vehicle comprises a water emulsion of at least one synthetic resin base.

11. Composition as defined in claim 10 wherein said vehicle comprises an acrylate emulsion system.

12. Composition as defined in claim 6 wherein said chromium chromate is intimately associated with finely divided insoluble inorganic extender material.

13. Composition as defined in claim 12 wherein said extender material comprises magnesium silicate.

14. Composition as defined in claim 12 wherein said extender material comprises finely divided talc.

* * * * *